United States Patent [19]

Burman

[11] 4,312,520
[45] Jan. 26, 1982

[54] SEMI-TRAILERS

[75] Inventor: Keith Burman, Wellingborough, England

[73] Assignee: York Truck Equipment Limited, Northamptonshire, England

[21] Appl. No.: 115,079

[22] Filed: Jan. 24, 1980

[30] Foreign Application Priority Data

Jan. 26, 1979 [GB] United Kingdom ............... 02879/79

[51] Int. Cl.$^3$ ............................................. B60R 27/00
[52] U.S. Cl. ................................... 280/765; 248/352; 248/408; 280/766; 403/325; 403/326
[58] Field of Search ............... 280/763, 764, 765, 766; 254/86 H, 86 R; 108/12; 403/321, 322, 330, 324, 325, 326; 248/240.4, 240.3, 240.2, 240, 293, 407, 408, 352

[56] References Cited

U.S. PATENT DOCUMENTS

| 760,473 | 5/1904 | Nichols | 403/324 |
|---|---|---|---|
| 3,643,907 | 2/1972 | Ham | 280/763 X |
| 3,860,216 | 1/1975 | Brown | 254/86 H |
| 4,035,096 | 7/1977 | Miller | 248/408 |
| 4,108,472 | 8/1978 | Weir | 280/763 |
| 4,148,162 | 4/1979 | Goodrich | 280/764 |

FOREIGN PATENT DOCUMENTS 494638  5/1954  Italy .................................. 254/86 H Primary Examiner—Joseph F. Peters, Jr.
Assistant Examiner—D. W. Underwood
Attorney, Agent, or Firm—Wood, Herron & Evans

[57] ABSTRACT

A semi-trailer having at its front end at least one landing leg (8) which may be supported in its operative position by a strut (12) which is mounted slidably and pivotally to the chassis by means of a mounting (16) and which leg(s) is(are) raisable by a power unit; the strut(s) (12) may be locked by pin or pins (22) engaging in holes (29, 52) in the strut and the pin(s) latched in at least a partially disengaged position for movement of the strut between the operative position of the leg and an inoperative position, the pin(s) being unlatched to engage in a hole (29, 52) by movement of the strut in the mounting.

6 Claims, 6 Drawing Figures

SEMI-TRAILERS

This invention relates to trailers, and in particular to semi-trailers.

Semi-trailers are usually provided with a landing leg or legs at their front end, which are used to support the front of the semi-trailer when the tractor unit is detached.

The landing legs are movable between an operative position, in which they engage the ground and support the semi-trailer, and an inoperative position, in which they are moved clear of the ground after the tractor unit is attached and whilst the trailer is being towed. This movement of the landing legs is normally performed manually, usually by winding the legs up and down by means of, for example, levers or braces and intermediate gears. This operation, however, takes a considerable amount of time and effort.

A semi-trailer in accordance with the invention having at least one landing leg characterised in that a hydraulic or compressed air power unit is provided to move the or each, landing leg, between its operative and inoperative position.

Preferably the power unit comprises one or more air chambers connected to a source of compressed air which may be on a tractor vehicle for the trailer and having a push rod connected to the landing leg(s) for example through a pivot tube extending across the width of the trailer and rotatably mounted in the side rails of the trailer and carrying two landing legs, one at each side of the trailer.

The, or each, landing leg is preferably held locked in the down, operative position by means of a strut which can be locked in a position extending angularly between the vertical leg and a fixed position on the trailer chassis.

The strut is preferably arranged to slide through a tube pivotally mounted on the chassis, the tube and strut preferably being provided with holes which are aligned in the operative and inoperative positions to receive a locking pin to prevent the strut sliding through the tube.

The locking pin is removed to allow the strut to slide through the tube and is preferably then held latched in the open position, the latch preferably being released automatically to allow the locking pin to bear on the side of the strut, as a result of a movement of the strut through the tube, so that when the locking pin is again aligned with a hole in the strut it can engage in that hole to lock the strut in the raised or downward position respectively.

The invention will now be further described by way of example with reference to the accompanying drawings in which, FIG. 1 is a side elevation of a part of a semi-trailer in accordance with the invention showing the landing leg in its "down" operative position.

Figure 4:
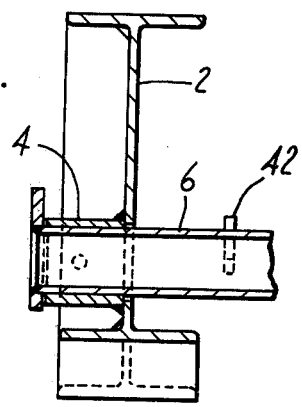
FIG. 4 is a section on the line A—A of FIG. 3 to show details of the mounting of the landing legs on the trailer.

The semi-trailer, partly shown in the drawings comprises two main side rails generally indicated at 2 each of which is provided with a pivot boss 4 (see FIG. 4) receiving a tube 6 which extends across the width of the trailer and which carries, at each end outside the respective main rails 2, a landing leg 8 carrying support wheels 10.

Figure 1:
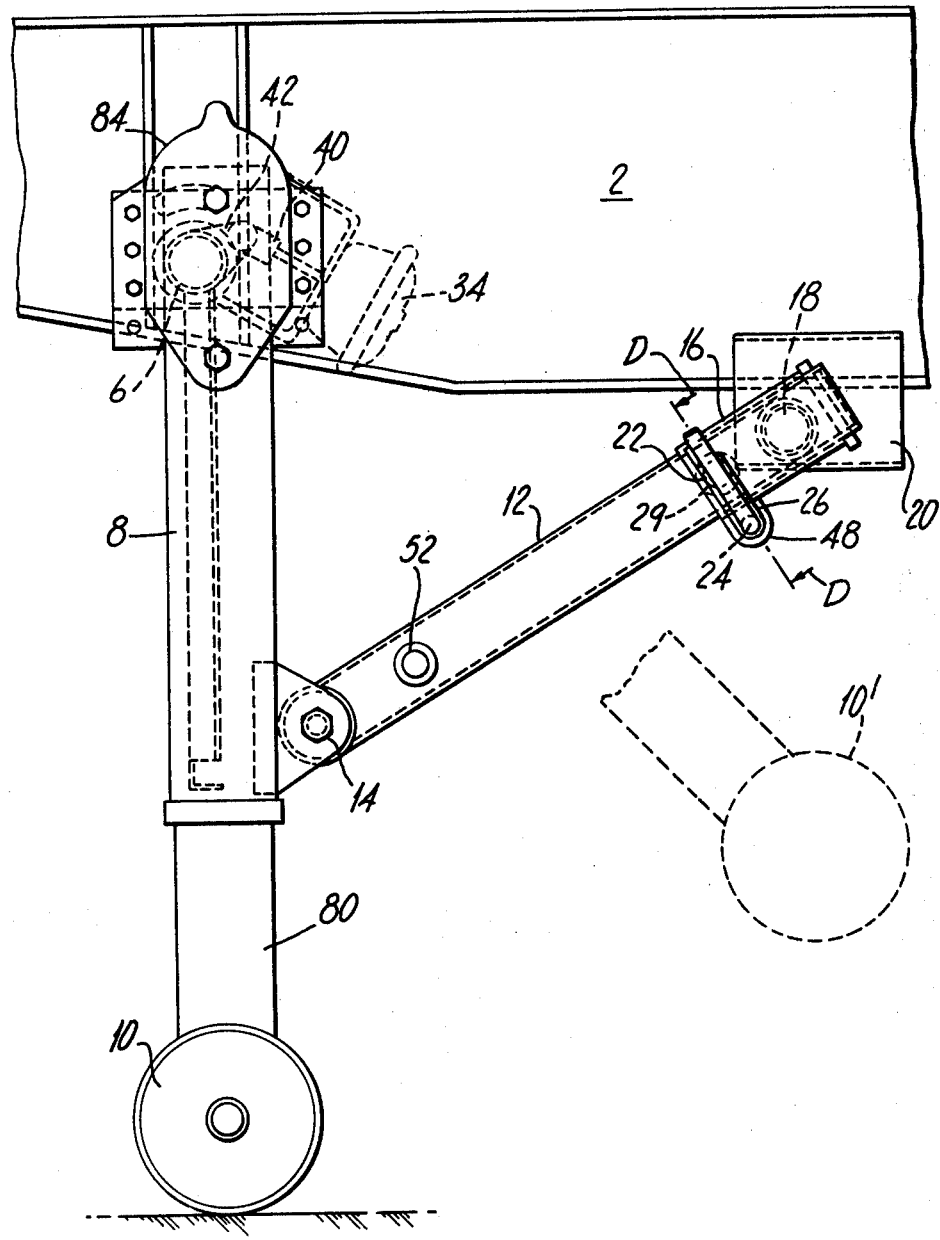
Figure 2:
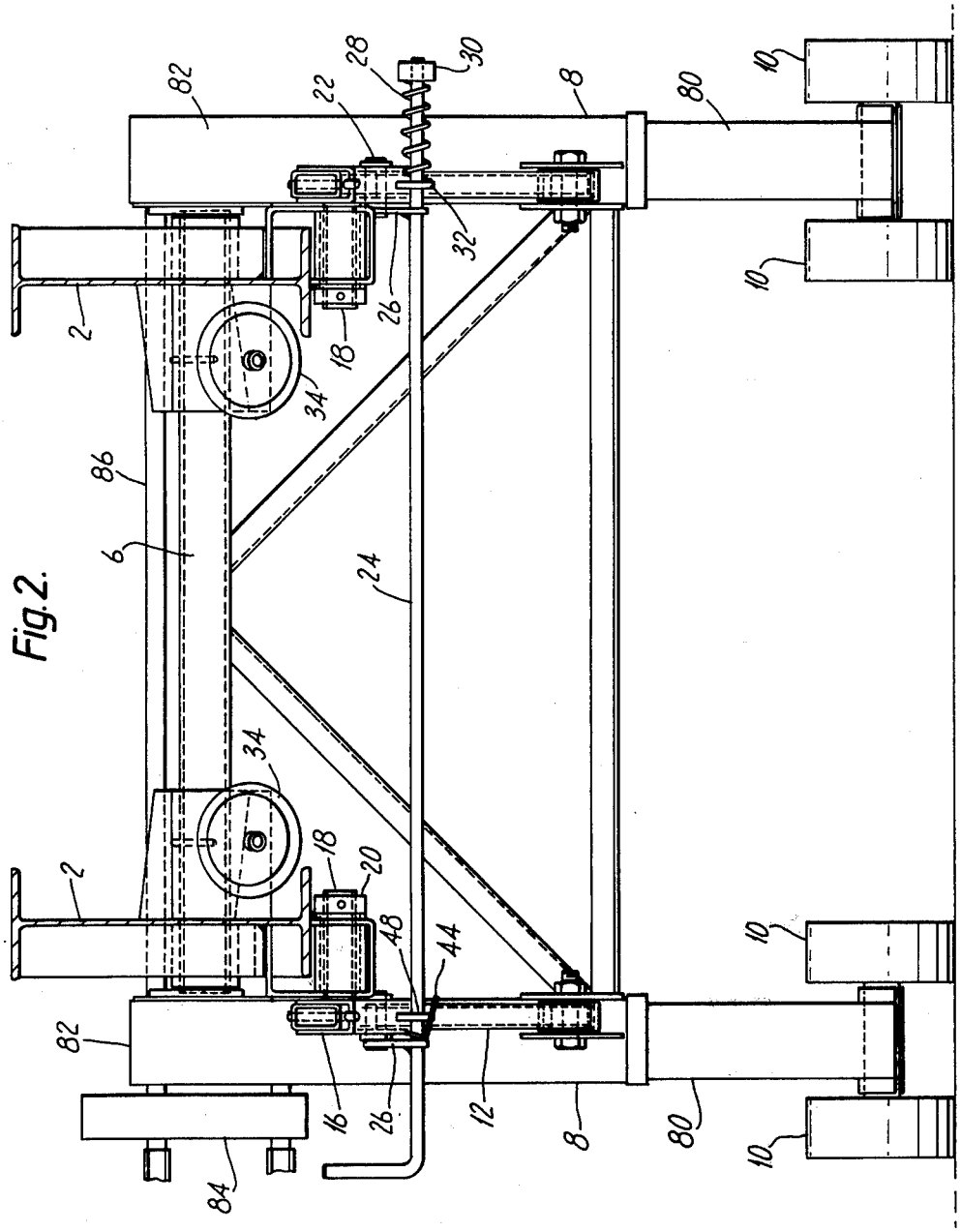
FIG. 2 is an end elevation corresponding to FIG. 1.
Figure 3:
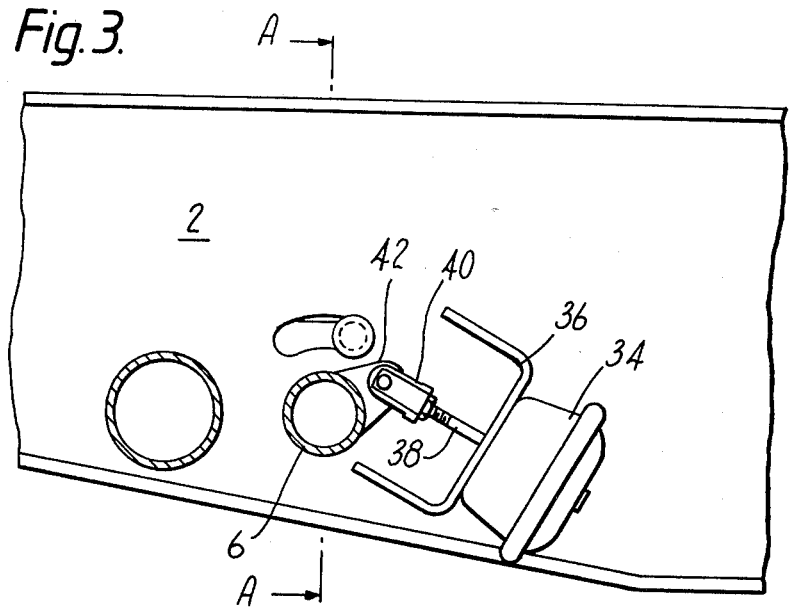
FIG. 3 is a scrap view corresponding to FIG. 1 but with one of the trailer side rails removed to show details of the operation of the landing legs.

It will be apparent that the legs and wheels can pivot upwardly from their down operative position as shown in FIGS. 1 and 2 on rotational movement of the support tube 6 in the bosses 4 on the side rail.

In order to prevent accidental upward movement of the landing legs a strut 12 is provided for each landing leg, extending angularly upwards from a point 14 where it is pivotally connected to the leg and to a tubular support member 16 through which the strut can slide, the tubular member being itself carried by a trunnion member 18 pivotally mounted in a bracket 20 attached to the main side rail 2 of the trailer.

Figure 5A:
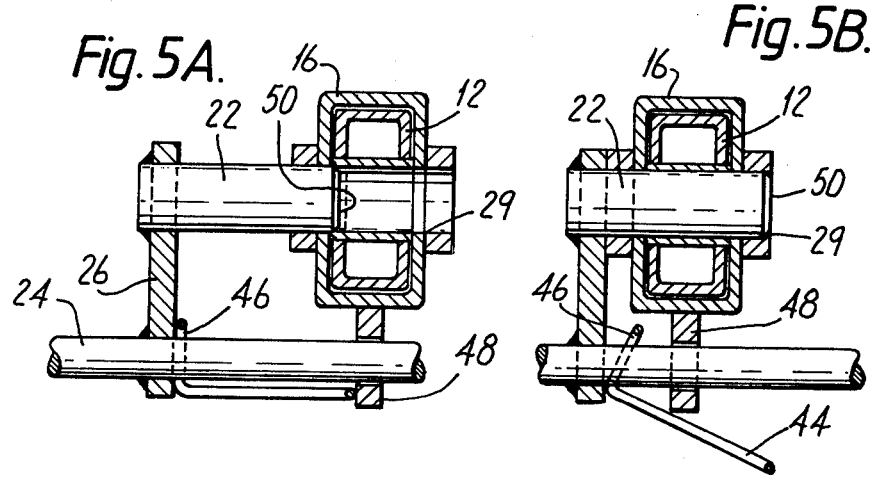
FIGS. 5A and 5B are sections on the line D—D of FIG. 1 showing details of the latch for the support strut for the landing legs in its locked and unlocked positions respectively.
Figure 5B:
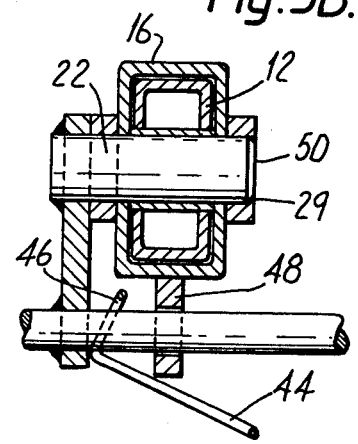

The strut 12 is locked in its operative position as shown in FIGS. 1, 2 and 5B by means of a locking pin 22 which is carried by a locking rod 24 through a bracket 26, the pin 22 passing through aligned holes in the sleeve 16 and strut 12 as can clearly be seen in FIG. 5B. The locking rod is urged in the locking direction to maintain the locking pin 22 in its locking position by means of a spring 28 (see FIG. 2) at one side of the trailer which acts between a collar 30 secured to one end of the locking rod 24 and a fixed plate 32 on strut 12 on said one side.

Two air chambers 34 are provided one at each side of the trailer for each landing leg respectively, and receiving compressed air from a compressed air source (not shown). Each chamber 34 is mounted on a bracket 36 carried by the side rails 2 and has a push rod 38 connected through a clevis 40, to an arm 42 extending out from the main support tube 6. It will be seen that as air is supplied to the chambers 34 and the push rods 38 are extended, the support tube 6 is pivoted in an anti-clockwise direction as shown in FIG. 1 to raise the landing legs.

Such movement of the landing legs can only take place if the struts 12 are free to slide upwardly through their support tubes 16 and in order to enable such a sliding movement to take place, an operator has first manually to pull the locking rod 24 to the left as shown in FIG. 2 against the bias of the spring 28 to move the locking pins 22 for each latch out from engagement with holes 29 in the struts 12.

When the locking pins have been so removed a latch member 44 which is in the form of an L-shaped member, the shorter arm of which is provided with a hole 46 through which the push rod 24 passes is moved so that the end of the longer arm engages against a bracket 48 depending outwardly from the tube 16, which bracket is also provided with a hole through which the locking rod 24 passes.

As can be seen in FIG. 5A the latch member 44 then extends between brackets 26 and 48 and acts to hold the locking rod and hence the locking pins 22 in an open unlocked position to enable the strut tube 12 to slide through the support tube 16.

On release of compressed air into the air chambers 34 from a source of compressed air which is not shown in the drawings but which may be carried by a tractor vehicle (not shown), the landing legs are then pivoted upwardly with the struts 12 sliding through the tube 16.

When the locking pin 22 is in its latched open position as shown in FIG. 5A its nose 50, which is formed with a tapered extremity extends slightly outwardly from the hole in the support tube 16 into the path of the strut 12 as can clearly be seen in FIG. 5A. Thus as the strut moves up through the support tube the edge of the hole 29 in the strut engages the tapered extremity of the locking pin which acts to push the pin further out from the strut and to the left as shown in FIG. 5A against the bias of spring 28. This movement increases the distance between the brackets 26 and 48 so that the latch member 44 can drop downwardly under its own weight free of the side surface of the bracket 48. In other words the latch holding the locking pin out from engagement is automatically released as the strut slides upwardly.

The end 50 of the locking pin then bears on the side of the strut and when the pin is aligned with a further hole 52 in the strut i.e. when the landing leg is fully raised, the pin is moved in the hole 52 by reason of the strength of the bias spring 28 so as to lock the strut and hence the landing leg in the raised inoperative position.

When it is desired to lower the legs the locking rod 24 is again pulled out by an operator and the latch member 44 engaged. The landing legs can then pivot downwardly in a clockwise direction as seen in FIG. 1 under their own weight. The speed of this downward movement being restricted by a restriction in the airline leading the air chambers 34. The downward movement of the strut 12 again automatically dis-engages the latch 44 allowing the locking pin 22 to bear on the side of the strut so that it can automatically re-engage in the hole 29 to hold the struts locked with the landing legs in the down position.

In order to retract the lower part 80 of legs 8 into the upper part of the leg 82, the lower part 80 is raised by gear box 84 actuated by a crank (not shown) in a known manner. Gear box 84 transmits its drive to the far side of trailer by means of a connecting rod 86 (see FIG. 2).

It will be appreciated that the compressed air operation of the landing legs is used only to lift the landing legs to their raised inoperative position, the legs being free to fall down into the operative position under their own weight.

Provision may be made so that the legs can be raised manually if the compressed air supply should fail for any reason.

I claim:

1. Apparatus for supporting the front end of a semi-trailer, said apparatus comprising
   two ground engaging landing legs mounted to the chassis of the trailer, each leg being connected to the other for part rotational movement on a common shaft extending across the width of the trailer,
   a compressed air power cylinder connected to said legs and operable to raise the feet of said legs between a ground engaging operative position and a ground free inoperative position, said common shaft being mounted to the trailer and operably connected by crank means to a push rod of said compressed air power cylinder, said legs being lifted to said inoperative position upon compressed air being fed to said cylinder,
   a strut extending angularly from at least one of said legs to said chassis for holding said leg in said operative position, said strut being slidably and pivotally mounted to said chassis in a mounting,
   locking means engageable with said strut to hold said strut in said operative and inoperative positions, said locking means comprising a pin engageable with a first hole and a second hole in said strut, said pin being resiliently biased to engage in either said first or second hole by biasing means, an end portion of said pin being chamfered, said pin's chamfered portion extending into at least one of said holes in said latched out position, an edge of either hole engaging said pin's chamfered portion to force said pin against said biasing means fully out of said hole and to cause said locking means to be released, upon movement of said strut between said operative and inoperative leg positions, and
   latch means to hold said pin at least partially out of either hole in a latched out position.

2. Apparatus as claimed in claim 1 wherein said pin is connected to a manually operable locking rod.

3. Apparatus as claimed in claim 2 wherein said latch means comprises a latch member pivotally mounted on said locking rod,
   a first bracket connecting said rod and one said pin,
   a second bracket mounted to said mounting,
   said latch means engaging in said latched open position between said first and said second brackets to hold said pin in said at least partially disengaged positions out of said holes.

4. Apparatus for holding the landing leg of a semi-trailer in a ground engaging operative position and a ground free inoperative position, said leg being pivotally mounted at its upper end to the chassis of the trailer, said apparatus comprising
   a stay pivotally mounted at one end to said leg below said pivotal mounting at the upper end, said stay being slidably mounted in a stay mounting towards its other end, and said stay having at least two locking pin receiving holes therein,
   a locking pin on said stay mounting arranged to engage in a first hole in said operative position and to engage in a second hole in said inoperative position,
   biasing means for resiliently biasing said pin into engagement with either said first or second hole,
   latch means for holding said pin at least partially out of either hole into a latched out position, and
   an end portion of said pin being chamfered, said chamfered portion extending into at least one hole in said latched out position, an edge of either hole engaging said pin's chamfered portion to force said pin against said biasing means fully out of said hole and to cause said latch means to be released upon movement of said strut between said operative and inoperative leg positions.

5. Apparatus as claimed in claim 4 wherein two said legs are provided, each having a said strut and wherein each said strut is provided with a pin and each said pin is connected to a manually operable locking rod,
   said locking rod extending at least between said struts.

6. Apparatus as claimed in claim 5 wherein said latch means comprises a latch member pivotally mounted on said locking rod,
   a first bracket connecting said rod and one said pin,
   a second bracket mounted to said mounting,
   said latch means engaging in said latched open position between said first and said second brackets to hold said pins in said at least partially disengaged positions out of said holes.

* * * * *